E. F. HOLINGER.
DIES FOR MANUFACTURING SEAMLESS TUBES.
APPLICATION FILED NOV. 6, 1913.
1,122,753.
Patented Dec. 29, 1914
4 SHEETS—SHEET 1.
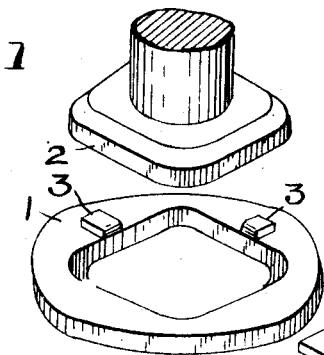
Fig.1
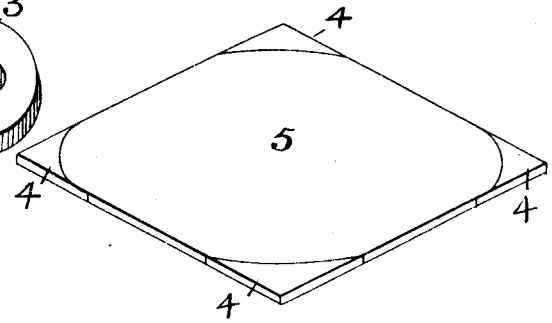
Fig.2.
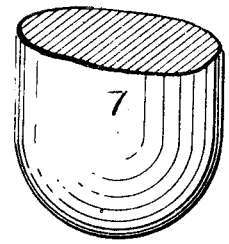
Fig.3.
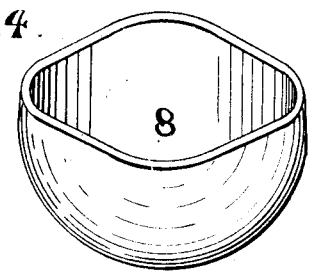
Fig.4.
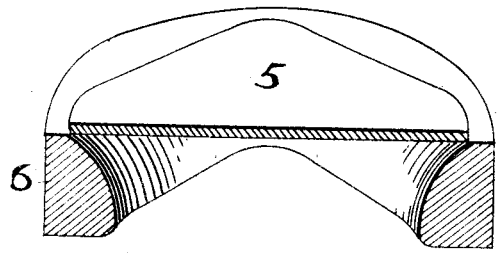
Fig.5.
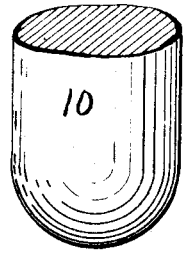
Fig.6.
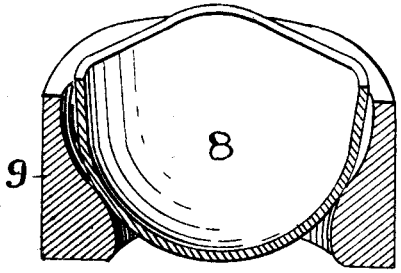
WITNESSES
R. F. Dilworth
Elva Stasick
INVENTOR
E. F. Holinger
by F. N. Barber
Attorney E. F. HOLINGER.
DIES FOR MANUFACTURING SEAMLESS TUBES.
APPLICATION FILED NOV. 6, 1913.

1,122,753.

Patented Dec. 29, 1914.
4 SHEETS—SHEET 2.

WITNESSES
R. F. Dilworth
Elva Staniele

INVENTOR
E. F. Holinger
by F. N. Barber
Attorney

E. F. HOLINGER.
DIES FOR MANUFACTURING SEAMLESS TUBES.
APPLICATION FILED NOV. 6, 1913.

1,122,753.

Patented Dec. 29, 1914

4 SHEETS—SHEET 3.

WITNESSES

INVENTOR
E. F. Holinger

E. F. HOLINGER.
DIES FOR MANUFACTURING SEAMLESS TUBES.
APPLICATION FILED NOV. 6, 1913.

1,122,753.

Patented Dec. 29, 1914.
4 SHEETS—SHEET 4.

INVENTOR
ATTORNEY

UNITED STATES PATENT OFFICE.

EMIL F. HOLINGER, OF McKEESPORT, PENNSYLVANIA.

DIES FOR MANUFACTURING SEAMLESS TUBES.

1,122,753.

Specification of Letters Patent.

Patented Dec. 29, 1914.

Original application filed June 11, 1913, Serial No. 773,014. Divided and this application filed November 6, 1913. Serial No. 799,486.

*To all whom it may concern:*

Be it known that I, EMIL F. HOLINGER, a citizen of the United States, residing at McKeesport, in the county of Allegheny and State of Pennsylvania, have invented new and useful Improvements in Dies for Manufacturing Seamless Tubes, of which the following is a specification.

My invention relates generally to the manufacture of seamless tubes, but, more specifically, it relates to dies for manufacturing such tubes from plates or blanks by what is known as the cupping process.

Heretofore, the metal plates or blanks which were shaped by dies into seamless tubes were cut or stamped out of sheet metal by circular dies.

It is one of the objects of my invention to utilize a larger percentage of each of the plates from which the blanks are stamped than is utilized by making the blanks circular. I prefer to make the plates or blanks square with rounded corners. I subject the rounded cornered square blanks to cupping operations in rings or dies with correspondingly shaped openings, the successive dies having their openings gradually assuming a circular shape. Heretofore, the cupping rings or dies have had even circular openings, but I prefer to make some of the rings or dies with the edges of the openings therein fluted or scalloped in order to increase the reduction of the diameter and wall thickness of the cups, and to produce a lateral flow of the metal in each alternating die, referring specially to the operations where reduction of the wall thickness is accomplished. This lateral flow of the metal improves the structure of the material above what would take place if only circular dies were used.

Figure 7:
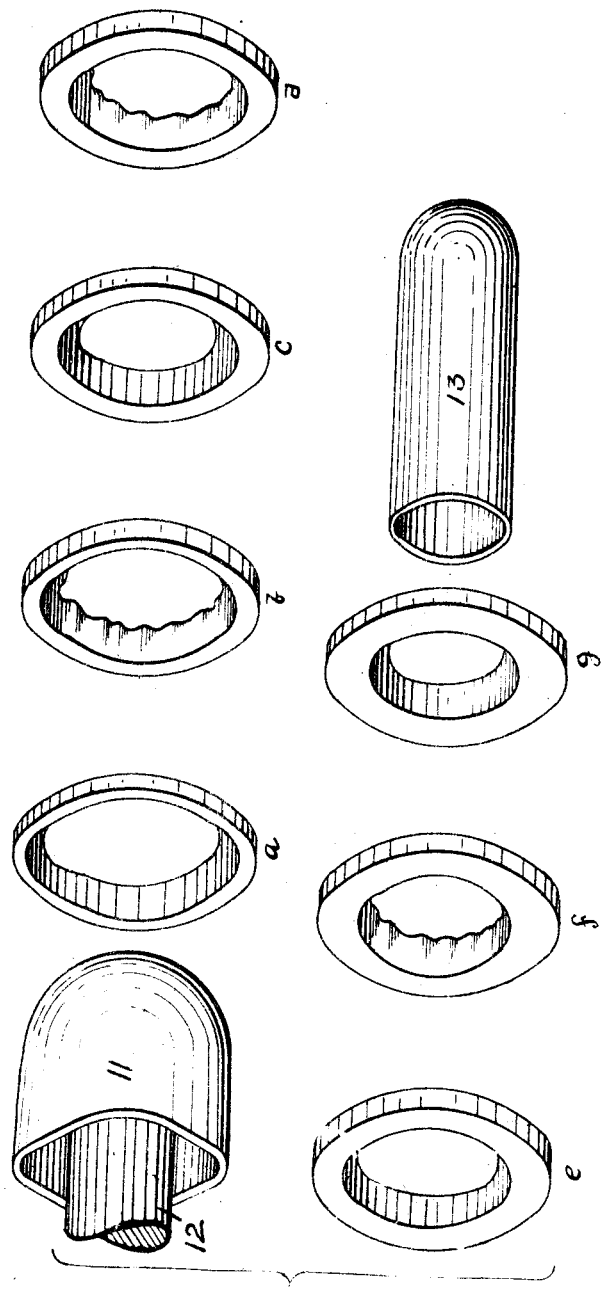
Figure 8:
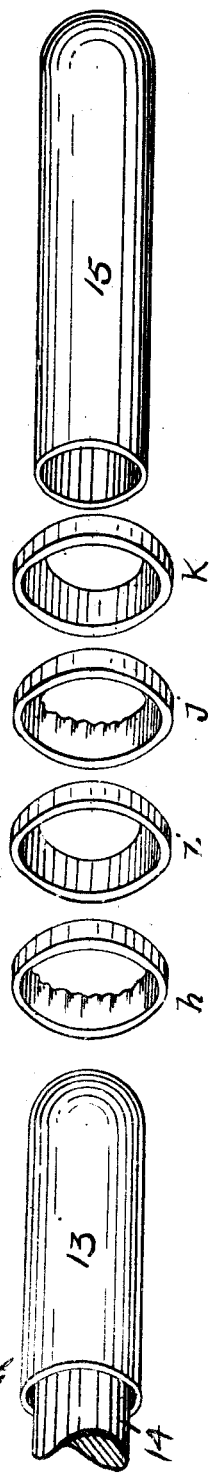
Figure 9:
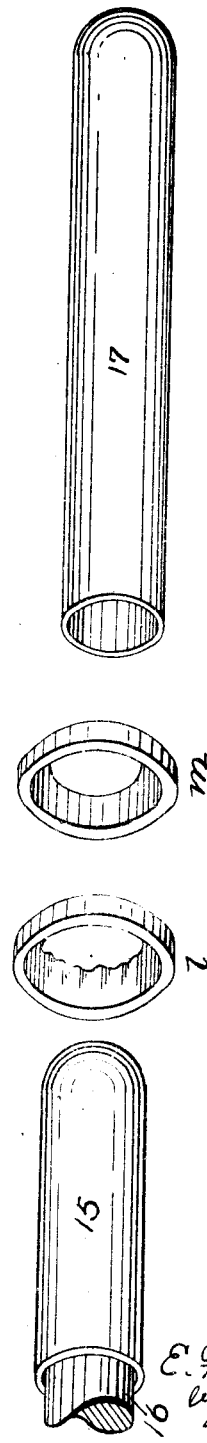
Figure 10:
Figure 10:
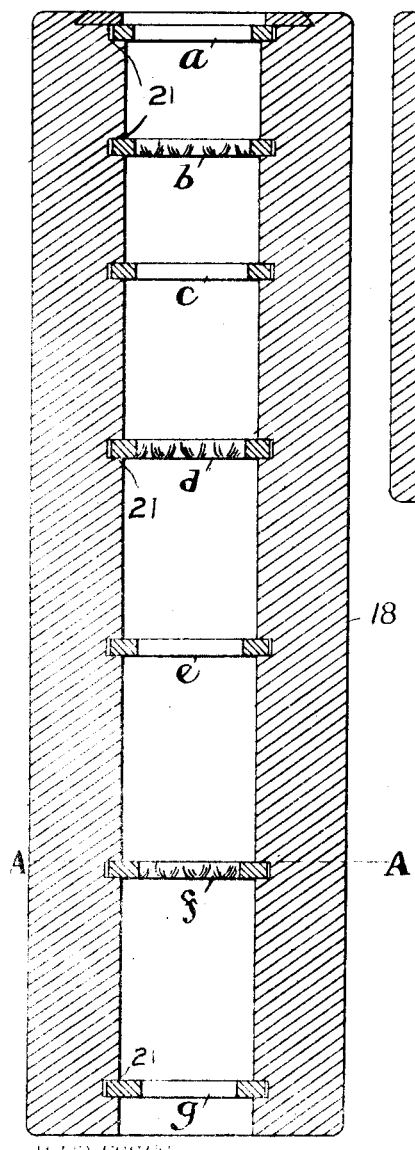
Figure 11:
Figure 11:
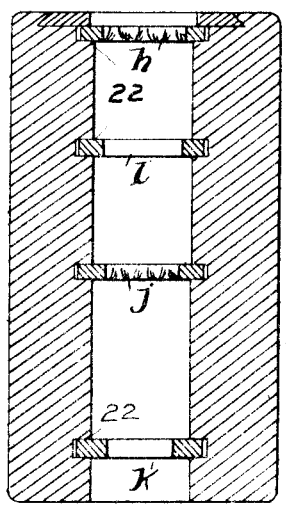
Figure 12:
Figure 12:
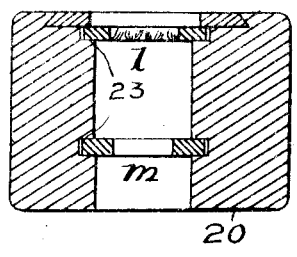
Figure 13:
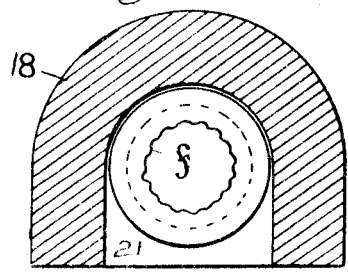

Referring to the accompanying drawings, Figure 1 is a perspective view showing the dies by which my improved blanks are stamped from square sheet metal. Fig. 2 is a perspective view, on a larger scale than Fig. 1, of one of my blanks with the severed corners in their original places. Fig. 3, a perspective partly in section showing one of my blanks located on the ring die and below the punch ready for the first cupping operation. Fig. 4, a perspective of the cup or tube produced by the dies shown on Fig. 3. Fig. 5, a perspective partly in section showing the cup of Fig. 4 seated in the second ring ready for the second cupping operation. Fig. 6, a perspective of the cup or tube produced by the dies shown on Fig. 5. Fig. 7, perspective views of a series of ring dies through which the cup shown in Fig. 6 is successively pushed, the punch and the cup before passing through the first ring being shown at the left of the first die, and the cup after passing through all the rings being shown at the right of the last die. Fig. 8, a view like Fig. 7, but illustrating the cupping operations continued with a smaller punch and with rings having smaller openings. Fig. 9, a view like Fig. 8, but illustrating the cupping operations continued with a still smaller punch and with rings with still smaller openings. Fig. 10 is a vertical section of the ring dies shown on Fig. 7 assembled in a holder also in vertical section, the punch therefor being in side elevation and broken away at its upper end. Fig. 11 is a vertical section of the ring dies shown on Fig. 8 assembled in a holder also in vertical section, the punch therefor being in side elevation and broken away at its upper end. Fig. 12 is a view similar in character to Figs. 10 and 11, but showing its ring dies and the punch shown in Fig. 9 together with the holder for the ring dies. Fig. 13 is a section on the line A—A on Fig. 10.

On the drawings, 1 represents the lower or ring member of the cutting or stamping dies by which my improved blank is cut from a plate of sheet metal, and 2 is the upper or punch member of the said dies. The die opening in the ring member has its source rounded, and its sides between the rounded corners conforming to the sides of a square, that is to say, the die opening is a square with rounded corners. The punch member 2 is shaped to correspond to the opening in the ring member.

3. 3 are two gage-lugs on the upper face of the ring member, the lugs being at adjacent sides of the die opening and flush with the walls of the die opening.

A square plate may be laid on the die member 1 with its adjacent edges against the gage-lugs 3. The remaining two edges of the plate will register with the two remaining sides of the die opening. When the punch member passes through the ring-member, the corners of the plate are cut off. Fig. 2 shows the plate with the severed corners 4 in their original positions with respect to the remaining portion of the plate, which portion, marked 5, constitutes the blank with which the cupping operations now to be described begin.

The blank 5 is laid on the top of the ring die 6, having its walls tapered downwardly. The opening in the die 6 is shaped horizontally to correspond with the shape of the blank.

7 represents the square round cornered punch for forcing the blank 5 through the die 6. When the blank 5 has been forced through the die 6 by the punch 7, it becomes the cup or short tube 8, shown in Fig. 4. The lower end of the punch 7 is half-spherical, so that it produces a cup with a half-spherical bottom, but gradually assuming upwardly a square round cornered shape or section at its top. This is done in order to take care of the metal at the rounded corners of the nearly square plate so as to produce a cup with an even edge. In Fig. 5, the cup 8 is shown seated in the ring or die 9, somewhat smaller than the ring or die 6. The punch or male die 10 forces the cup 8 through the die 9 and produces the tube or cup 11, shown in Fig. 6. The cup 11 is somewhat longer than the cup 8 and has a smaller cross-section, but it still preserves its rounded bottom and square round cornered edge. In the next operation indicated by Fig. 7, the elongated cup 11 is forced successively through the seven ring dies *a* to *g* (which number may be larger or smaller) by the punch or male die 12, whereby the still more elongated cup or tube 13 is produced. The rings *a* to *g* are assembled in regular order in the vertical holder 18 provided with the slots 21 to receive the same and are so made that the opening in each succeeding ring, which is smaller than the preceding ring, approaches more and more a circular shape, the last ring *g*, becoming preferably entirely or nearly circular. In the elongating operation shown by Fig. 7, practically no reduction of the wall thickness is accomplished, the cup being merely elongated and reduced in diameter, in order to bring it into the shape of a tube suitable for subsequent drawing and wall reduction, especially for changing the square round cornered cup into a cup with a circular cross-section or edge. The die *a* has a slightly smaller opening than the die 9. In the next operation, shown in Fig. 8, the cup or tube 13 is forced by the male die or punch 14 through the rings or dies *h* to *k*, which are arranged in regular order in the slots 22 in the holder 19 and successively smaller and smaller, thereby producing the considerably elongated cup or tube 15, the opening in the ring *h* being smaller than the opening in the ring *g*. In the next operation shown in Fig. 9, the tube 15 is forced by the punch or male die 16 through the rings *l* and *m*, whereby the still more elongated tube 17 is produced, the opening in the ring *l* being smaller than that in the ring *k*, and the opening in the ring *m* being smaller than that in the ring *l*.

A novel feature, an improvement in hot drawing, is introduced into the operations shown in Figs. 7, 8, and 9. It will be noticed that every other ring, that is, the rings *b*, *d*, *f*, *h*, *j*, and *l*, is scalloped or fluted. This is done in order to increase the reduction of the tubes or cups and to produce a kneading action which acts laterally on the material and improves the structure. It has been found in practice that, in reducing the wall thickness of a tube by hot drawing, if the metal can be prevented from gathering, or piling on itself in front of the rings, a considerable increase in reduction of diameter or wall thickness, as the case may be, can be accomplished. The prevention of this gathering or piling of the metal in front of the rings is accomplished by internally scalloping or fluting the alternate rings. The tube to be reduced being pushed through a scalloped or fluted ring is corrugated longitudinally and considerably reduced in diameter or wall thickness, or both, the reduction being more than would result by pushing the tube through a plain ring. When the tube, which has been scalloped or fluted by one die, is pushed through the next die which is plain, that is, not scalloped or fluted, a plain smooth tube is again produced. This smooth tube is pushed through the succeeding scalloped or fluted ring. The tubes are forced through the alternately scalloped and smooth rings until the desired reduction and elongation have been secured, and in addition, a superior structure has been produced through the lateral spreading of the metal, or kneading action of the scalloped or fluted dies.

One gain in my invention over the present practice of beginning the operation with a circular blank is in utilizing more of the material from which the blank is cut. The loss of material in rounding the corners of a square plate to produce my blank 5 amounts to approximately 7¼%, whereas the loss by the production of circular blanks amounts to 21.46%, so that I convert 92½% of a square plate into a tube while by the present practice only 78.54% of a square plate is converted into a tube. Another gain is accomplished by increasing the reduction per ring, or per series of rings, on account of the scalloped or fluted rings. By my improvement I can produce a hot drawn tube of a given length and diameter in fewer operations than is accomplished by the present practice. Furthermore, by the lateral force of the metal produced by the scalloped or fluted dies, I produce a tube whose structure is superior to what is accomplished in practice with ordinary plain circular rings.

This application is a division of my application, Serial Number 773,014, filed June 11, 1913.

I do not limit my invention to any definite number of drawing operations or to any definite number of dies per operation.

I claim—

1. In apparatus for the manufacture of tubing by cupping operations, a series of ring dies, the openings in the dies being successively smaller and alternate dies of the series having their openings scalloped or fluted.

2. In apparatus for the manufacture of tubing by cupping operations, a series of dies with square round cornered openings, the openings in the dies being successively smaller, and one or more male dies for forcing a blank, initially a square with rounded corners, through the said openings in the dies.

3. In apparatus for the manufacture of tubing by cupping operations, a series of ring dies, having successively smaller openings, the first die of the series having a square round cornered opening, the dies having their openings successively approximately more and more a circular outline.

4. In apparatus for the manufacture of tubing by cupping operations, a series of ring dies, having successively smaller openings, the first die of the series having a square round cornered opening, the dies having their openings successively approximately more and more a circular outline, and some of said dies having their openings scalloped or fluted.

5. In apparatus for the manufacture of tubing by cupping operations, a series of ring dies, having successively smaller openings, the first die of the series having a square round cornered opening, the dies having their openings successively approximating more and more a circular outline, and alternate ones of said dies having their openings scalloped or fluted.

6. In apparatus for the manufacture of tubing by cupping operations, a series of ring dies, having successively smaller openings, the first die of the series having a square round cornered opening, the dies having their openings successively approximating more and more a circular outline, others of said dies having their openings circular.

Signed at Pittsburgh, Pa., this 5th day of November, 1913.

EMIL F. HOLINGER.

Witnesses:
 ALICE E. DUFF,
 F. N. BARBER.